Feb. 21, 1967 J. A. KHAN 3,305,156

FASTENER MACHINES

Filed Feb. 1, 1965

Joseph A. Khan

Feb. 21, 1967 J. A. KHAN 3,305,156
FASTENER MACHINES
Filed Feb. 1, 1965 4 Sheets-Sheet 2
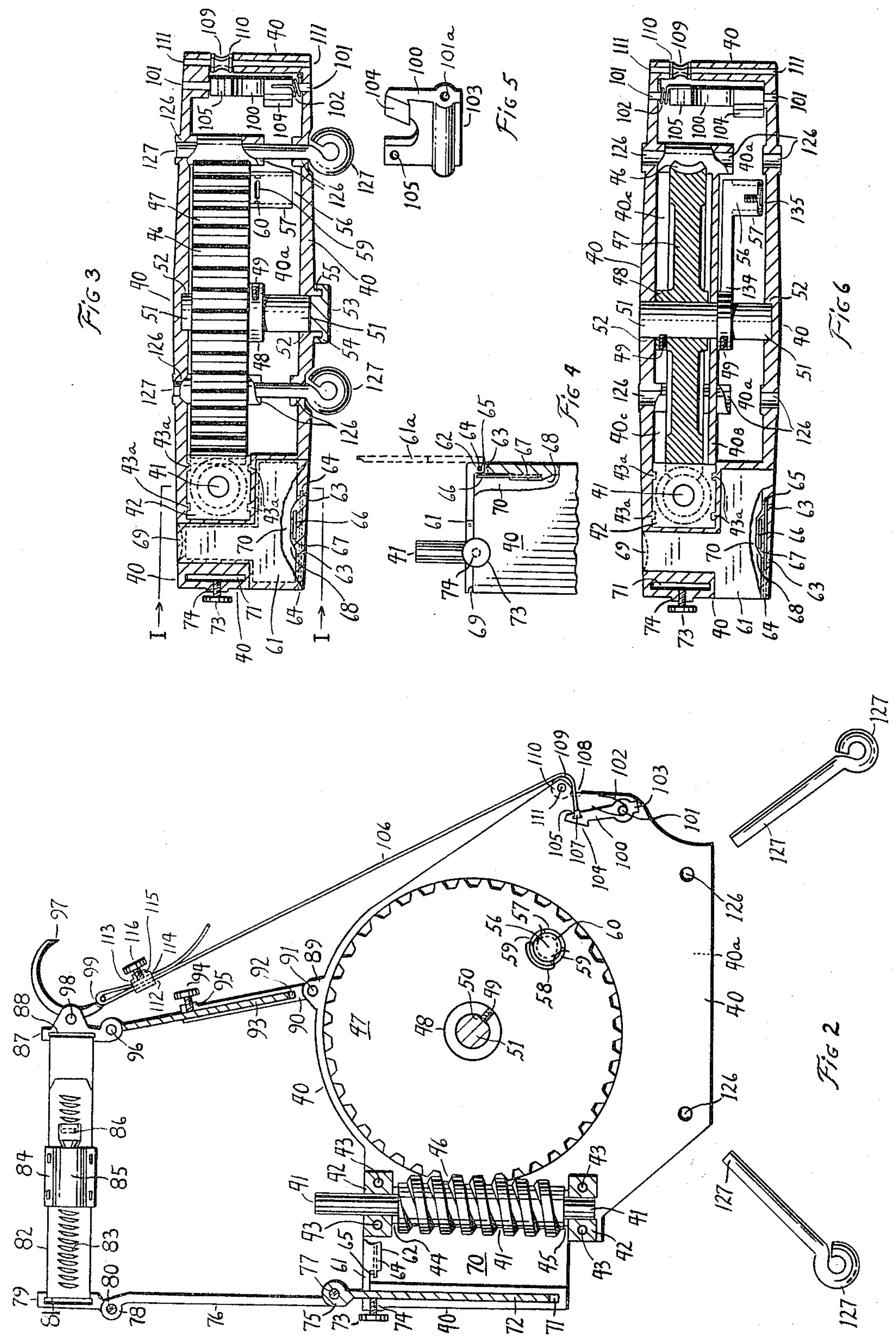

Feb. 21, 1967
J. A. KHAN
3,305,156
FASTENER MACHINES
Filed Feb. 1, 1965
4 Sheets-Sheet 3
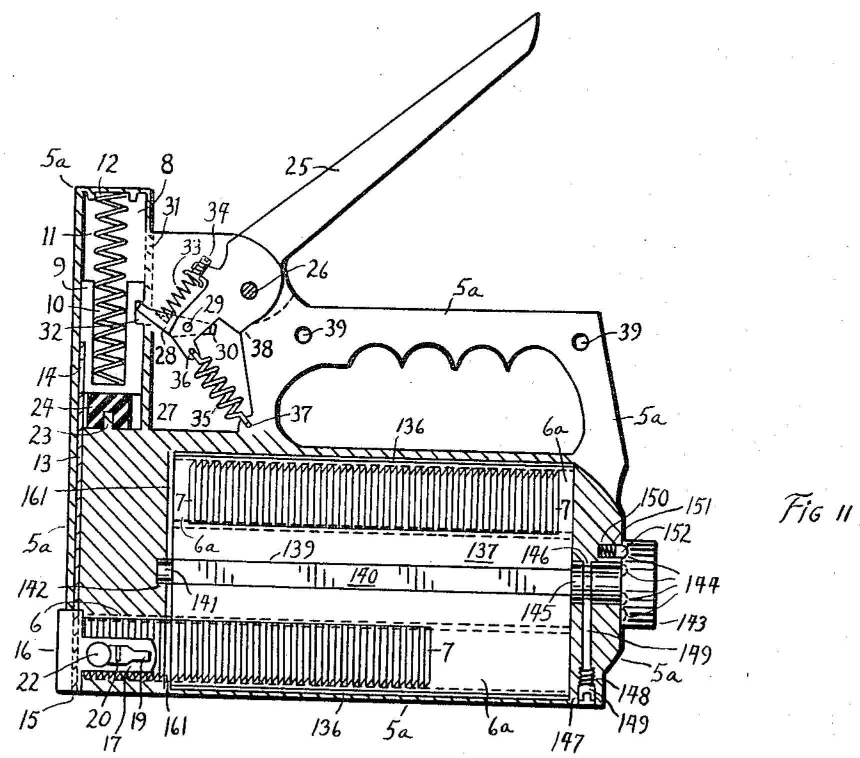
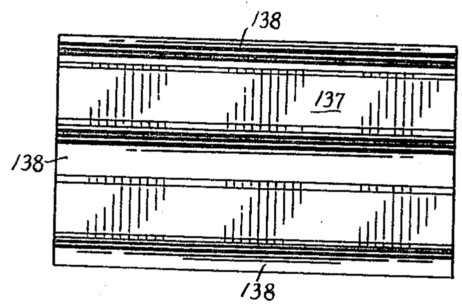
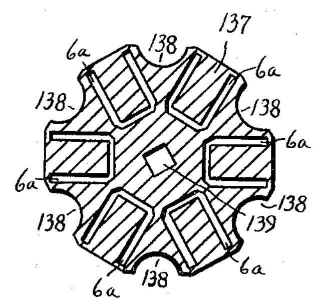
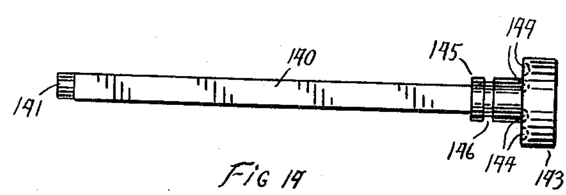
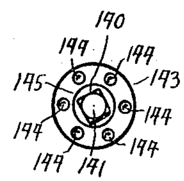
Joseph A. Khan FASTENER MACHINES
Filed Feb. 1, 1965
4 Sheets-Sheet 4
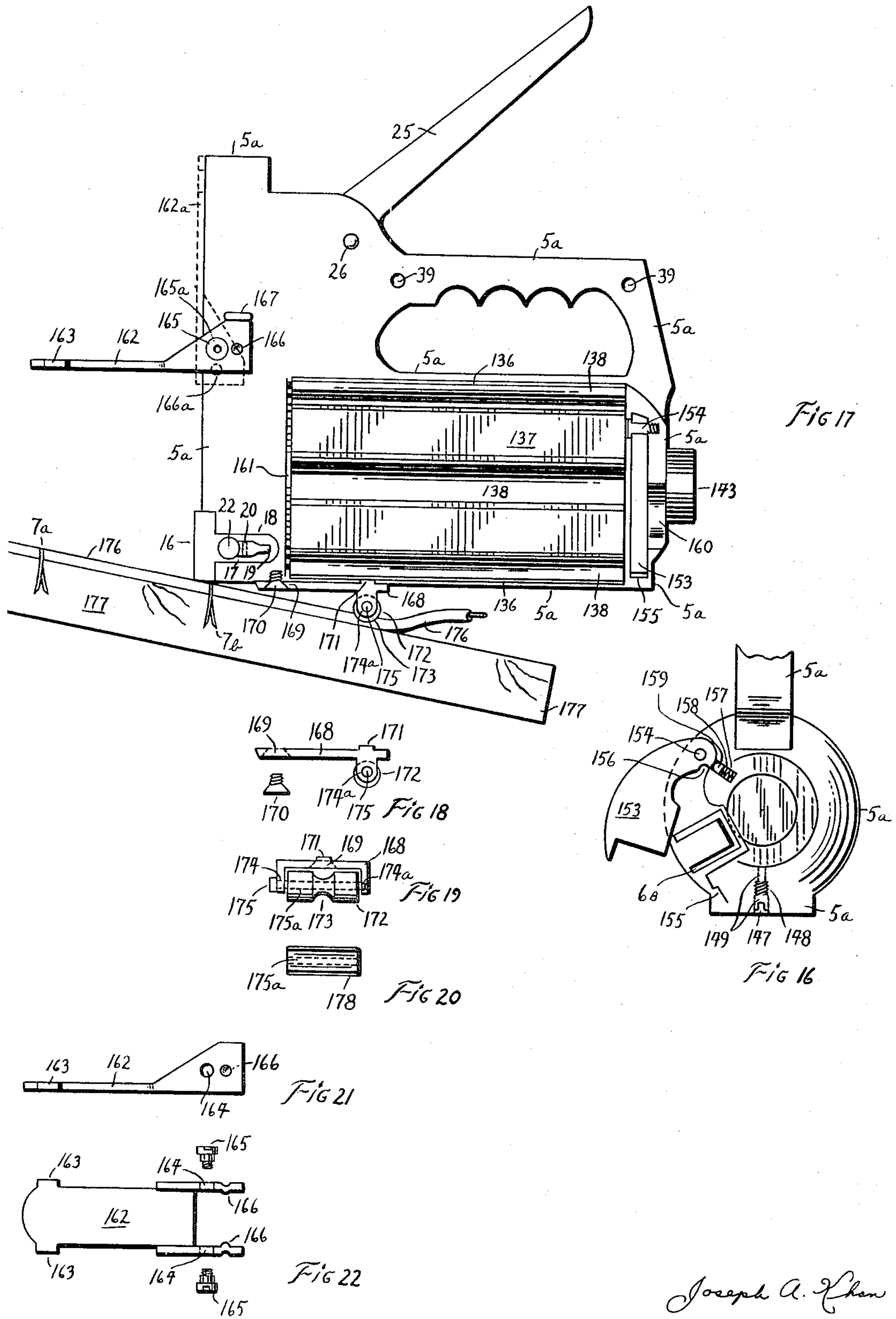
Joseph A. Khan United States Patent Office 3,305,156

Patented Feb. 21, 1967

1

3,305,156

FASTENER MACHINES

Joseph Anthony Khan, 910½ Sunset Ave., Asbury Park, N.J. 07712

Filed Feb. 1, 1965, Ser. No. 429,366
5 Claims. (Cl. 227—132)

The present invention relates in part to a new and economical means for efficiently driving industrial fasteners of the staple, nail, or pin type and while the machine may be of stationary, factory bench type for securing together certain mass produced assemblies such as window and door sash furniture, and the like, the machine is especially suitable for fully portable manually operable usages.

An object of the present invention is to provide an improved fastener driving machine of sturdy, economical construction that can be produced by low cost mass production methods of manufacture, and which is of such simple and readily accessible assembly that repairs can be readily effected by semi-skilled repairmen.

A further object of the invention is to provide a measuring scale applied to a fastener machine to accurately space driven fasteners for strong, neat appearing and economical fastening.

Yet another object of the invention is to provide a removable attachment for electric drills for non-slip connections to drill powered tools.

A further object of the invention is to provide a fastener driving machine with a new plural passage fastener magazine to increase the fastener carrying capacity of the machine substantially.

Another object of the invention is to provide a fastener machine with a new pressure lever used to force the nose of the machine against the workpiece for firm fastening in hardwoods.

Toenailing a fastener into a workpiece increases the fastener's holding power.

A still further object of the invention is to provide a new toenailing attachment for a fastener driving machine and one so constructed as to use interchangeable rollers for a variety of fastener purposes.

Other objects, features and advantages of the present invention will become apparent from the following drawings and description:

FIGURE 2 is a side view of the gear driver partially in section.

FIGURE 3 is a top view of the gear driver partially in section.

FIGURE 4 is a front view of a top portion of the gear driver partially in section taken substantially on the line I—I of FIGURE 3.

FIGURE 5 is a perspective view of the hand lever holding cam.

FIGURE 6 is a top view partially in section of the modified gear driver.

FIGURE 11 is a side view partially in section of the stapler with a plural staple magazine.

FIGURE 12 is a side view of the plural staple magazine.

2

Figures 1, 7, 8, 9, 10:
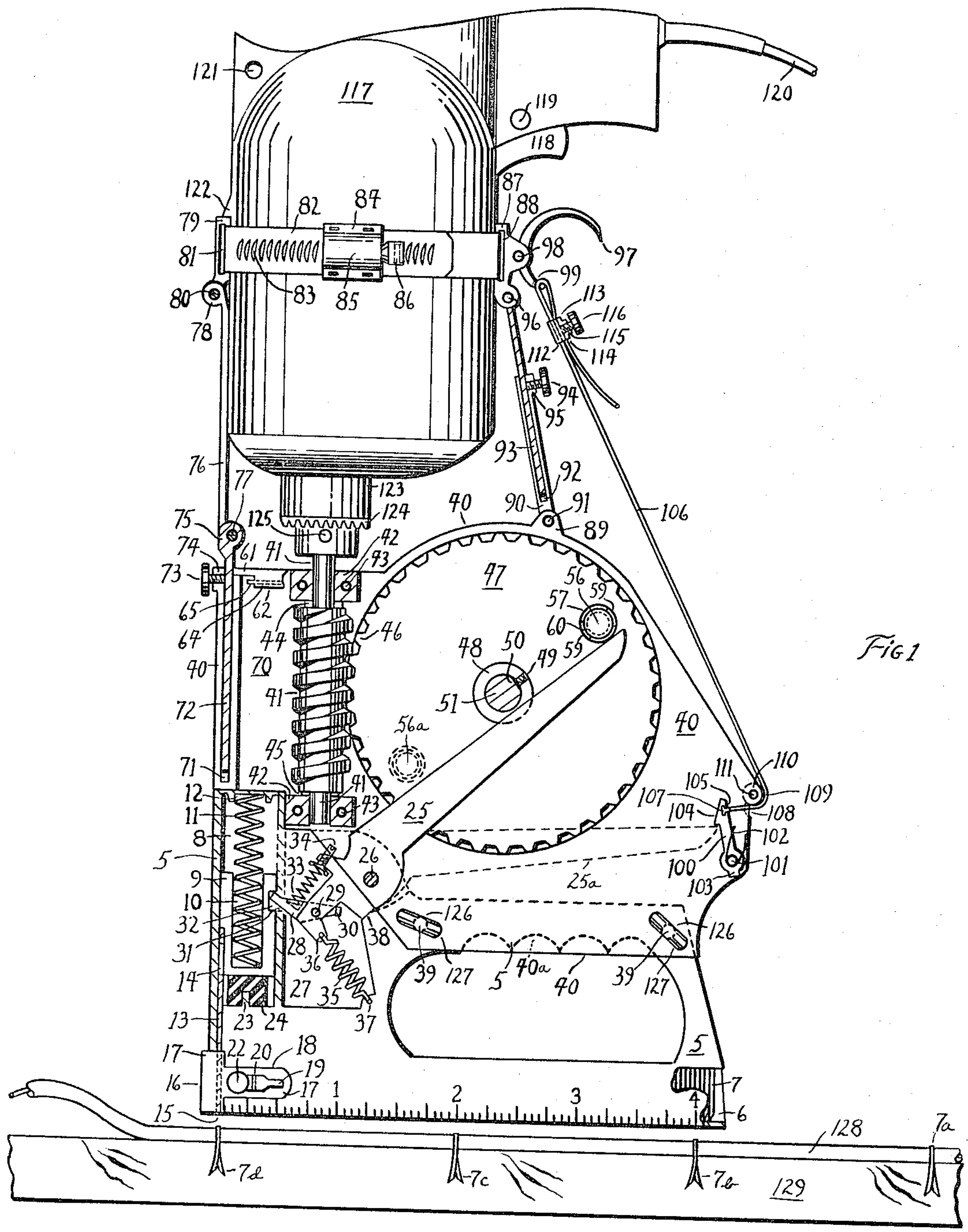
FIGURE 1 is a side view of the stapler, gear driver and electric drill partially in section to show the operating parts positioned above a workpiece.
FIGURE 7 is a side view partially in section of the non-slip attachment for electric drill powered tools.
FIGURE 8 is a side view partially in section of the modified non-slip attachment for electric drill powered tools.
FIGURE 9 is a top view of the magnetic staple feed assembly.
FIGURE 10 is a side view of the magnetic staple feed assembly.

FIGURE 13 is an end view of the plural staple magazine.

FIGURE 14 is a side view partially in section of the magazine attaching shaft.

FIGURE 15 is a front view of the magazine attaching shaft.

FIGURE 16 is a rear view partially in section of the plural magazine loading gate in the lower portion of the stapler body.

FIGURE 17 is a side view partially in section of the stapler with a plural staple magazine, pressure lever, and toenailing attachment with wire roller, positioned on a workpiece in a staple driving position.

FIGURE 18 is a side view of the toenailing attachment with wire roller.

FIGURE 19 is a front view of the toenailing attachment with wire roller.

FIGURE 20 is a front view of the modified roller construction.

FIGURE 21 is a side view of the pressure lever.

FIGURE 22 is a top view of the pressure lever.

A scale graduated in sixteenths of an inch and marked at one inch intervals such as 1, 2, 3, and 4 is suitably applied to the lower laterally extending magazine portion of the stamped steel stapler body 5. A stick of divergent point staples 7 is inserted into the staple passageway 6 thereby loading the stapler. The vertical columnar portion of the stapler 5 contains a cylindrical chamber 8. Reciprocably slidable in said chamber is a staple driving ram 9. The ram has a top opening vertically extending bore 10 which telescopically receives the lower portion of the ram spring 11. The ram is resiliently urged to a normal lower position by the ram spring 11 the upper portion of which is seated in the spring guide 12. An upwardly projecting shaft 23 in the lower portion of the cylinder chamber positions and secures the ram stop 24 therein. The front face of the ram has a T slot formed therein to removably receive the upper end 14 of a non-magnetic steel staple driver 13. The driver 13 reciprocates vertically in a staple driveway 15 to drive the foremost staple in the stick of staples in the magazine. Driveway 15 is formed by the inner U-shaped portion of the magnet 16. The magnet is used to hold and draw the staples in turn under the reciprocating staple driver. The magnet assembly consists of the magnet suitably fastened between plates 17; pintle arms 22 that are spring loaded 21 and pivot on pivot pins 20, thereby urging the wedge shaped pintles 19 inwardly between the plates. To mount the magnet assembly to the stapler body 5 the operator grips the arms 22 between the thumb and index finger; depressing the arms slightly eases the application force required. The plates 17 are then slid rearwardly in depressed rails such as 18 that are formed in each side of the body 5. On release of the arms 22 it is understood that the pintles 19 engage in suitable pintle receiving slots within the rails thereby securing the magnet assembly to the body 5.

The hand lever 25 is pivotally mounted 26 to the body 5. A cavity 27 normally enclosed within the body 5 accommodates the ram lifting cam 28 that is pivotally mounted 29 to the lower forwardmost portion of lever 25

The cam 28 is resiliently urged in a counter-clockwise direction by a spring 33 compressed between a suitable spring guide in the cam and a screw adjustable spring guide 34 mounted on a projecting ear of the lever 25 respectively. Counter-clockwise movement of the cam 28 is limited by a projection 30 on the rearward extremity of the cam contacting an adjacent portion of the lever 25.

The rear wall of chamber 8 has a vertically extending opening 31. In the lower at rest position of the ram 9 the forward extremity of the cam 28 extends through opening 31 and engages the lifting slot 32 formed in the upper rear face of the ram. A spring 35 attached to the lever 25 at 36 and the body 5 at 37 resiliently pulls the lever in a counter-clockwise direction. Counter-clockwise movement is limited by the stop 38 on the body 5 contacting a flat faced portion of the lever 25. Mounting holes 39 the purpose of which will be explained are suitably positioned in the upper laterally extending portion of the body 5.

A precision aluminum die casting forms the gear drive body 40. Certain components of the operating elements within may be inserted from a normally open bottom portion 40A of the body 40 in assembly or a suitable outside closure plate may facilitate their installation within the body 40A where modified construction so requires. Said closure plate preferably being fastened with screws in a removable manner to the body 40 to facilitate rapid repairs. An oil sealing gasket may be interposed between the body 40 and said closure plate where a wet lubricant chamber is provided as in modified construction. An oil filler plug may also be provided preferably in the top of the body 40 in this type construction.

A steel driver worm 41 is vertically mounted between nylon bearings 42. The bearings are secured in place by projecting pintles 43*a* that enter holes 43 in the sides of the bearings. Plastic bearings are inclined to heat buildup in use. Pintles 43*a* may have hollow threaded bores to carry off heat and facilitate their removal when desired, and be driven or pressed into place through suitable holes in the wall of the body 40. Where a side mounted closure plate is used pintles 43*a* may be hollow and preferably are an integral projecting part of the body 40 and the closure plate respectively. Thrust bearings 44 and 45 are inserted at appropriate places between the worm 41 and bearings 42. Gear teeth 46 on the worm gear 47 mesh with the worm. The worm gear hub 48 carries a screw 49 that is screwed against a flat 50 on the previously inserted cross shaft 51 to lock the gear 47 to the shaft. The shaft is a running fit in a precision reamed bore 52 in the body 40. A cap 53 with threads 55 therein screws on a threaded projecting portion 54 of the body 40 to limit side movement of the shaft 51 when running.

The gear 47 carries an integral cylindrical shaped crank pin 56. Near the base of pin 56 is a circumferential groove 60. A thrust sleeve 57 is slid over the pin 56. Near the base of sleeve 57 are two slots 59. A roughly horseshoe shaped steel wire retainer 58 is slid over the slots 59. V-shaped portions of the retainer 58 enter the slots and groove 60 thereby retaining the sleeve 57 on the pin 56.

At the top of the forward portion of the body 40 is a top opening cover plate 61 having a downwardly extending portion 62 that moveably fits into a recess 63 formed in the side of the body 40. A drilled hole 64 extends rearwardly from the front face of the body 40 to just beyond the rearward terminal face of the recess 63. Assuming that the plate 61 has been properly positioned with recess 63 a retaining pin 65 in the hole 64 secures the plate 61 to the body 40. A flat spring 66 is secured in a slot 67 formed in an inwardly projecting portion 68 of the body 40. The upper portion of spring 66 resiliently bears against the portion 62 to secure the plate 61 in an open 61*a* or closed position. A finger nail notch 69 on the plate facilitates plate openings. The roughly T-shaped chamber 70 under the plate is used to conveniently carry ring pins 127, staple sticks 7, spare trigger cords 106, lubricant tubes or other related parts.

In the forward portion of the body 40 is a top opening vertically extending slot 71 that telescopically receives the lower front arm 72. Vertical elevation of this arm may be secured at any desired position by tightening the thumbscrew 73 in the threaded bore 74 which intersects the slot 71. The upper portion 75 of arm 72 has an opening therein to receive the lower portion of the upper front arm 76. This normally moveable joint may be made rigid by tightening the slotted head pintle screw 77 which connects arms 72 and 76 together. The upper portion 78 of arm 76 has an opening therein to receive the lower portion of the front band carrier 79. This normally moveable joint may be made rigid by tightening the slotted head pintle screw 80 which connects arm 76 and carrier 79 together. A circular, steel attaching band 82 passed through a slot 81 in the carrier. Worm slots 83 are formed in the band 82. On a portion of the band a worm housing 84 is rigidly mounted. Within a raised semi-cylindrical portion of the housing 85 a worm is mounted that is adjustable to engage the slots 83 to open or close the band by means of a slotted head extension 86 integral with the worm. The band 82 passes through the rear band carrier 87 by means of a slot 88 formed therein. On a top portion of the body 40 is a projecting ear 89 with a suitable cross slot formed therein that receives the lower portion of the lower rear arm 90. A cross pivot pintle 91 secures the ear 89 to the arm 90. Within the arm 90 is a top opening vertically extending slot 92 that telescopically receives the lower portion of the upper rear arm 93. Vertical elevation of arm 93 may be secured at any desired position by tightening the thumbscrew 94 in the threaded bore 95 which intersects the slot 92. A cross pivot pintle 96 secures the arm 93 to the carrier 87. A trigger 97 is pivotally mounted to the carrier 87 by means of a cross pintle 98. A lower radially extended portion of the trigger has a slot 99 formed therein to receive a cord 106 as will be explained.

Within a lower rearward portion of the body 40*a* a hand lever holding cam 100 is pivotally mounted. Cam hole 101*a* receives a pintle 101 to the body 40. A cam spring 102 is coiled around a portion of the pintle 101. A forward arm of spring 102 bears against the back of cam 100. A rearward arm of spring 102 is compressed against the inner face of the rear wall of the body 40 thereby urging the upper portion of cam 100 in a counter-clockwise direction. This movement is limited by a stop 103 on the lowest portion of the cam contacting the inner face of the rear wall of the body 40. The upper front face of the cam 100 has a beveled projection 104 said projection forms a holding cam below the bevel. A cross extending portion of cam 100 has a cord passage hole 105 drilled therein. The upper portion of the cord 106 is passed through this passage. A metal cordstop 107 crimped on the end of the cord secures this end of the cord to the cam 100 or in lieu of cordstop 107 the cord may be knotted. The free end of the cord is passed out of a cord passage 108 in the rear of the body 40 and around a groove 109 in a revolveable cord guide wheel 110. A pintle 111 secures said wheel to the body 40. The free end of cord 106 is passed upwardly through a cord passage 112 in the cord clamp body 113 then through the slot 99 and downward through another cord passage 114 in the body 113. This passage is intersected by a threaded bore 115 in which a thumb screw 116 is mounted. Cord 106 is of sufficient length to permit adjustments to be made between slot 99 and cam 100 when mounting the body 40 to various size electric drills. Thumbscrew 116 secures such adjustments. Cam 100 and wheel 110 are of plastic construction.

The electric drill 117 has a trigger switch 118 that may be locked 119 for continuous running. The drill may be of the self contained and rechargeable battery type or of the line cord 120 powered type. A hole 121 in an upwardly projecting flange on the drill permits the drill to be hung in a balanced position when not in use to prevent dropping the drill. Preferably a suitable strap with snap ring attaches the drill to the operator's waistbelt. The stop 122 is an integral forward projection of the drill housing. The drill chuck 123 is of the gear 124 adjustable type. A suitable gear key is inserted and turned in the key hole 125 when connecting the drill to driver bits. Holes 126 suitably positioned in the lower portion of the body 40 are of a size to receive ringpins 127.

To couple the stapler body 5 to the gear drive body 40 the upper worm shaft 41 is turned by hand to bring the pin 56 to the upper portion of its travel if necessary. The upper laterally extending portion of the body 5 is inserted into the lower open portion 40*a* within the body 40. Ringpins 127 are inserted into holes 126 through aligned holes 39 and out the other side 126 of the body 40 thereby mounting the body 5 partially within the body 40*a*.

Drill 117 is inserted through the circular band 82. Drill chuck 123 envelopes the upper portion of the worm 41 and the chuck gear 124 is tightened. Thumbscrews 73, 94 and 116 are loosened to bring the band 82 with its attached elements to a position wherein the trigger 97 may be conveniently and comfortably pulled by the index finger of the operator. The band 82 is tightened. Thumbscrews 73 and 94 are tightened. The upper end of cord 106 is pulled to eliminate slack. Tension is correct when the spring 102 can just be felt counter pulling. Thumbscrew 116 is tightened as are screws 77 and 80. This completes the coupling of the stapler 5 gear driver 40 and drill 117.

Assuming the pasage 6 has been loaded with staples as herein described and the operator desires to fasten the electric wire 128 to the wood 129 using staples every two inches and further assuming the guide staple 7*a* and succeeding staples 7*b* and 7*c* have previously been driven, and electric power from the line cord 120 is available. The operation of the device is as follows:

The two inch mark 2 on the scale is positioned directly over staple 7*c*. This locates the driveway 15 exactly two inches from the previously driven staple 7*c*. Using the drill handle the driveway 15 is pressed against the wire. As the operator grips the drill handle he presses the switch 118 then locks the switch in continuous running position by pressing the switch lock 119. Drill 117 has a right handed twist. The worm 41 rotates. Gear teeth 46 mesh with the worm and rotate the worm gear 47 with its integral crank pin 57 in a clockwise direction. As the crankpin rotates it contacts the upper portion of the hand lever 25 forcing the lever downward within the body 40*a*. Cam 28 lifts the ram 9 compressing spring 11. As the lever 25 descends the rearward end of the lever contacts the beveled surface 104 of the cam 100. The cam is urged clockwise against the force of its spring 102 permitting further descent of the lever 25. As the lever descends below the bevel 104 the driver 13 is raised by the ascending ram 9 to a position above the top of the driveway 15 thereby permitting the foremost staple in the stick of staples to enter the driveway. The lower forward portion of the lever 24 pivots on the pintle 26 upward and backward at which point engagement is lost between the forward extremity of cam 28 and the slot 32 releasing the ram 9. Driver 13 on the ram engages and drives the foremost staple 7*d* in the passage 6 out of the driveway 15 further securing the wire 128 to the wood 129. Driven staple 7*d* is two inches from driven staple 7*c*. With the measuring scale shown distances to four inches 1, 2, 3, 4 between staples may be quickly and precisely measured and staples driven accordingly. For greater distances the scale may be advanced over the woodpiece from a pencil mark adjacent to driveway 15.

As the pin 57 continues its clockwise movement the spring 35 pulls the portion of the lever 25 to the rear of pintle 26 upward. Cam 100 urged forward by spring 102 engages and prevents further upward movement of lever 25. The pin 57 disengages and continues its movement 56*a*. In the 25*a* position of the lever held by cam 100 ram 9 is released and at rest against the ram stop 24. The drill can be stopped and stapling can now cease indefinitely without weakening the tension of spring 11.

Assuming the drill 117 is running and another staple is desired to be driven as herein described. The index finger of the operator pulls the trigger 97 cam 100 releases lever 25 the rearward portion of which rises as the forward lower portion is pulled downwardly and rearwardly in cavity 27 by spring 35. The forward extremity of cam 28 contacts the top of ram 9 and pivots on pintel 29 in a clockwise direction. The spring 35 compresses and permits cam 28 to slide downward to engagement in the slot 32. The rotating crankpin will repeat the cycle as previously described to drive another staple.

For quiet smooth running it is preferred to slow the ascent slightly of the rear portion of the lever 25 when released by cam 100. Before assembly of the stapler body 5 to the gear driver 40, the tension of spring 33 may be increased by means of the screw 34.

As more force will then be required by spring 35 to return the lever 25 the return is proportionally slower. This adjustment is to prevent clashing engagement which could occur occasionally when the clockwise rotating pin 57 met the cam released and counter clockwise ascending rear portion of lever 25.

Clashing could also be prevented by utilizing gear 47 to mesh with a suitable smaller gear with a crankpin thereon. A connecting rod from this crankpin would connect to cam 100 to intermittently prevent its rearward movement when the trigger 97 is pulled until pin 57 rotates to a position where it cannot be struck by the ascending portion of the cam released lever 25.

The stop 122 prevents considerable vertical thrusting force from being applied to the worm 41 as the drill 117 is pressed down while stapling. A stop 130 with a mounting screw hole 131, screw 132 and locating pintle 133 may be mounted to a previously drilled and topped drill housing in the same positioin as 122 and functions similarly.

The modified stop 130*a* which mounts like 130 provides a slot 130*b* which receives the front band carrier 79 to positively prevent vertical thrust in either direction.

Stop 130 and 130*a* which are fully detachable eliminate the need for special shapes and extensions of drill housings previously necessary to firmly mount drill powered tools.

The trigger 97 control of cam 100 assures precise stapling and reduced wear of the drill 117, gear driver 40 and stapler 5. With the drill continuously running there is no strain on the drive gears until the trigger 97 is pulled and the pin 57 then engages the lever 25. Without the trigger control of the cam 100 the motor of the drill would have to be started and stopped continuously in stapling resulting in arcing of the motor's brushes in some drills and generally erratic stapling performance. Electric drills with variable speed control switches could improve such erratic performance. However the adaptable trigger control is preferred for precise and simple performance.

In the modified construction of the gear driver the crankpin arm 134 is attached to the cross shaft 51 by means of the lock screw 49. The crankpin 56 has a thrust sleeve 57 secured thereon by a cap screw 135 into the center of the pin 56. A wall 40*b* between arm 134 and gear 47 forms a lubricant chamber 40*c* within the body 40 for wet lubrication of the gear 47 and worm 41.

The ring pins 127 may be inserted from either side of the body 40. Bolts with securing means at one end such as cotter pins or C rings can be substituted for ring pins 127 for a more permanent connection of body 40 to body 5. This precludes the possibility of the ring pins working out of holes 126–39 while stapling.

The body 40 and body 5 may be welded together or otherwise joined for unitized construction when desired.

The gear driver 40 may be powered by an electric, gasoline or other type motor using a flexible drive shaft with mounting chuck thereon or other means to couple the motor to the body 40 or the motor may be an integral unit within the body 40 with or without the driving elements of body 5 operably positioned within.

In kit form that comprises the driver 40, stapler 5 and drill 117 said drill becomes a useful accessory in itself. Where available as separate components the driver 40 and drill 117 may be required only when the increased use of the stapler 5 warrents powered stapling.

By scaling up the dimensions of the component parts of this invention very large fasteners may be economically driven. Compressors and related equipment are no longer necessary. Multiple gears and ram springs can further increase the size of the fasteners practical in this invention. Fasteners of the staple type have been shown being driven herein but it is obvious that the actuating force developed in this invention can be applied to drive nails, pins, spikes and other type fasteners.

Although the gear driver 40, stapler 5 and drill 117 has been provided in form that is especially adapted for fully portable manually use, it will be appreciated that this type of machine could readily be utilized in stationary set ups where some means of plunger or lever type or the like, may be utilized to actuate the trigger or may even replace the trigger and be connected directly to control means within the gear driver body.

The staple driving elements of stapler 5*a* are similar to stapler 5 in design and function. Holes 39 in the handle portion of this stapler also facilitate its connection to the gear driver 40 when powered stapling is desired. A large rectangular shaped opening 136 is formed in the stapler in which a plural staple passage magazine 137 is laterally positioned. The magazine may be of plastic or aluminum material and formed by extrusion or casting and broaching. Laterally extnding grooves 138 are formed on the length of the magazine for lightness. Through the center of the magazine is a square hole 139 around which six staple passages 6*a* are radially positioned. The main portion of the magazine shaft 140 is square shaped. The front end of the shaft terminates in a short cylindrical shaped portion 141. The rear end of the shaft has a large cylindrical shaped selector knob portion 143 in the front face of which six radially positioned concave depressions 144 are formed. Forward of portion 143 is a smaller diameter cylindrical shaped portion 145 with a circumferential groove 146 formed thereon.

Assuming the magazine 137 is correctly positioned in opening 136, shaft 140 is inserted through a rear opening portion of the stapler body and into the magazine hole 139. A round hole 142 in the front vertical extending wall of the opening 136 receives the forward cylindrical portion 141 of the shaft. A vertically extending bore 147 with threads 148 formed in the lower portion, receives a slotted head shaft retaining screw 149. The upper portion of which enters groove 146 preventing rearward movement but permitting revolving movement of the shaft 140. A hole 150 formed in the rear face of the stapler 5*a* has a spring 151 therein that resiliently urges a convex headed pintle 152 rearward against the front face of knob portion 143. A clockwise opening loading gate 153 is secured in a slot within the rear of the stapler body 5*a* by a retainer screw 154 to the body. A fingernail notch 155 formed in the body 5*a* facilitates opening the loading gate when desired. On the inner upper face of the loading gate is a concave depression 156. A hole 157 within the body 5*a* has a spring 158 therein that resiliently urges a convex headed pintle 159 to engage the depression 156 when the loading gate 153 is closed thereby retaining the gate in a closed but openable position.

A deep concave loading groove 160 formed in the stapler body 5*a* directly behind the gate 153 facilitates staple stick 7 insertions when loading. A short staple stick guide passage 6*b* in the body 5*a* directly in front of the gate 153 guides the staple sticks into the passages 6*a* when loading.

On each side of the body 5*a* are convex shaped projections such as 161 which may be an integral part of the body. These projections form a closure plate against which a portion of the front circumference and face of the magazine 137 with its passages 6*a* therein, may revolve. The body 5*a* has a staple passage 6 that opens forwardly at the nose of the body 5*a* and rearwardly in the lower portion of the front vertical extending wall of the opening 136.

The pressure lever 162 is of one piece heavy gauge stamped steel construction. Projecting ears 163 facilitate positioning the lever as will be explained. Two upwardly bent portions of the lever have holes 164 and inwardly directed peened convex projections 166. Pintle screws 165 pass partially thru the holes 164 and screw into tapped holes such as 165*a* on each side of the columnar portion of the body 5*a* thereby pivotally securing the lever to the body. The lever 162 when not in use may be pivoted upward to position 162*a* against the front face of the body 5*a*. In this position the projections 166 resiliently engage concave depressions 166*a* in each side of the body 5*a* to vertically retain the lever. The horizontal or working position of the lever is secured when the upwardly bent portions of the lever contact the lever stop projections 167 formed on each side of the body 5*a*.

The toenailing attachment 168 is of one piece heavy gauge stamped steel construction in the forward portion of which is a hole 169 thru which a mounting screw 170 may partially pass. On the upper rearward portion of attachment 168 is a raised cylindrical shaped locating pintle 171. A plastic or hard rubber roller 172 with a wire locating groove 173 centrally formed thereon, and a horizontally drilled center bore 175*a* is positioned between holes 174 and 174*a* formed in the downwardly extending portions of the attachment 168. An axle pin 175 with a threaded end is inserted through hole 174, bore 175*a*, and screws into hole 174*a* to secure the roller to the attachment 168. Roller 178 is of similar material as roller 172 and mounts to the attachment 168 in a similar manner. The body 5*a* has a suitable bored and tapped hole and a locating hole in which the mounting screw 170 and pintle 171 seat respectively thereby mounting the attachment 168 to the body 5*a*.

To fully load the magazine 137 the body 5*a* is held in a horizontal position. The loading gate 153 is opened. Pintle head 159 resiliently bears against the inner face of the gate to hold it in an open position. A stick of divergent point staples 7 slightly shorter than passage 6*a* is inserted thru the guide passage 6*b* and into the passage 6*a* within the magazine. Knob 143 is then turned sixty degrees (60°) by the thumb and index fingers of the operator. The cylindrical portions 141 and 145 of shaft 140 revolve in their respective portions of the body 5*a* while the square portion of shaft 140 in hole 139 turns the magazine. A click may be heard or resistance felt as the spring 151 resiliently urges the pintle head 152 into engagement with depression 144. Each time this engagement occurs a passage 6*a* is in alignment with the passage 6 and the passage 6*b*. Another staple stick is inserted thru passage 6*b* into passage 6*a* and the procedure is repeated until the six passages 6*a* within the magazine 134 are filled. The loading gate 153 is then closed. The body 5*a* is tilted forward. Staple stick 7, in passage 6*a* aligned with passage 6 slides forward until the foremost staple in the stick 7 is gripped and held in the magnet driveway 15 thereby the stapler 5*a* is ready for use.

Assuming the gear driver 40, drill 117, or electricity is unavailable and it is desired to securely fasten the electric wire 176 to the wood 177. The loaded stapler 5*a* with lever 162 and attachment 168 with roller 172 is operated as follows, staple 7*a* having previously been driven.

The thumb and index fingers of the operator grip the ears 163 and swing lever 162 down to horizontal position. Groove 173 is positioned on the wire 176. In this position the lower cross portion of driveway 15 is directly over and straddling the wire 176. The left palm of the operator presses down on lever 162 tilting the nose of the stapler 5a downward in firm engagement with the wire 176. Roller 172 acts as a fulcrum to tilt the nose of the stapler. Simultaneously the right hand of the operator grips the stapler 5a and presses downward on the lever 25. The wire 176 is firmly held down against the wood 177 by the roller 172. Ram lifting cam 28 lifts the ram 9. As the lever 25 is pressed further downward the ram 9 with driver 14 is released. The previously compressed spring 11 expands driving the ram downward in cylinder 8. Driver 14 engages and drives the first staple 7b in passage 6 into the wood. As the stapler 5a is tilted the driven staple is toenailed into the wood. On release of the lever 25 spring 35 returns the lever to its starting position.

The modified roller 178 when mounted to attachment 168 is used to smooth and hold down building paper, insulation and fibreboard prior to stapling. Its smooth surface precludes tearing the paper or foil in installation.

Were stapling to continue as herein described the remaining staples of stick 7 would diminish so that they no longer occupy passage 6a but only passage 6. A suitable viewing aperture may be used to determine when this occurs. Magazine 137 may then be rotated sixty degrees (60°). When the remaining staples in passage 6 are driven a forward tilt of the stapler 5a gravitates a new stick of staples into passage 6 to engage the driveway 15 of the magnet 16. Thus the stapler carries a large supply of staples quickly replenishable to the stapler nose.

Occasionally it may be desired to remove one or all of the previously inserted sticks 7 within the magazine 137. Pintle arms 22 are depressed and the magnet assembly is removed in a directly forward direction from the body 5a by means of the rails 18. This forward removal of the assembly permits the magnet 16 when in contact with the stick 7 aligned with passage 6 to conveniently withdraw this stick from the magazine. The knob 143 is rotated sixty degrees (60°) to align another passage 6a with passage 6. The stapler is tilted forward and the staple stick 7 drops by gravity out the now open forward end of passage 6. The procedure is repeated to remove the remaining sticks 7 from the magazine 137.

Thumbscrews may be used in place of the pintles 19 to secure the magnet assembly to the body 5a.

Staple sizes often refer to the leg length only. The width or crown being of the same size. Therefore assuming that each passage 6a is exactly the same size, six different leg lengths such as ¼", 5/16", ⅜", ½", 9/16", and ⅝" may be carried in the magazine 137 at one time and selected as desired.

Staple sizes may be marked on the outside of each passage 6a of the magazine 137 to facilitate quick staple selection. To facilitate staple inventory the total quantity of staples in the fully loaded magazine 137 may be successively numbered on the outside of each of the passages 6a.

While staple type fasteners are shown in use in the magazine 137 it is obvious that fasteners of the nail, pin or other types could be utilized in this type magazine using manual or powered means to drive them.

Various changes may be made in the details of construction without departing from the spirit and scope of the invention as defined by the appended claims.

I claim:

1. A power device for actuating a fastener driver having a compression spring driven fastener driving ram and a pivoted arm for releasably compressing the spring, said device comprising a frame, a worm gear rotatably mounted in the frame and having a crank pin eccentrically mounted thereon to intermittently engage the pivoted arm, a worm engaging said worm gear, and an electric motor mounted on said frame for driving said worm.

2. The device of claim 1 wherein means are provided to detachably retain the fastener driver in said frame.

3. The device of claim 1 wherein manually operated latch means on said frame releasably retain the pivoted arm in a position wherein the fastener drive spring is compressed.

4. The device of claim 1 wherein said frame has means for detachably mounting said motor, and said motor has a chuck for detachable connection to said worm.

5. The device of claim 1 wherein said frame has adjustable means for retaining said motor mounting means, whereby the device may be adjusted to receive motors of different capacities.

References Cited by the Examiner

UNITED STATES PATENTS

| | | | |
|---|---|---|---|
| 1,810,528 | 6/1931 | Peterson | 227—113 |
| 1,845,617 | 2/1932 | Metcalf | 227—131 X |
| 2,075,162 | 3/1937 | Begg | 227—131 X |
| 2,285,512 | 6/1942 | Harley | 227—132 |
| 2,368,552 | 1/1945 | La Place | 227—120 |
| 2,657,383 | 11/1953 | Siering et al. | 227—131 X |
| 2,754,515 | 7/1956 | King | 227—110 |
| 2,771,609 | 11/1956 | Klopstock | 227—120 X |
| 2,796,608 | 6/1957 | Johnson | 227—131 X |
| 2,994,878 | 8/1961 | Abrahamsen | 227—120 X |

GRANVILLE Y. CUSTER, JR., *Primary Examiner.*